United States Patent [19]

Smith

[11] Patent Number: 4,876,426
[45] Date of Patent: Oct. 24, 1989

[54] METHOD AND APPARATUS FOR WATER VAPOR CONTROL IN CONVECTION OVENS

[76] Inventor: Donald P. Smith, 2051 Valley View La., Dallas, Tex. 75234

[21] Appl. No.: 253,314

[22] Filed: Sep. 29, 1988

Related U.S. Application Data

[63] Continuation of Ser. No. 29,323, Mar. 23, 1987, abandoned, which is a continuation of Ser. No. 689,654, Jan. 8, 1985, abandoned, which is a continuation-in-part of Ser. No. 407,943, Aug. 13, 1982, Pat. No. 4,492,839.

[51] Int. Cl.$^4$ .............................................. H05B 6/78
[52] U.S. Cl. ...................... 219/10.55 A; 219/10.55 B; 219/400; 219/401; 99/474; 99/487; 426/523
[58] Field of Search .................. 219/10.55 B, 10.55 R, 219/10.55 E, 10.55 A, 10.55 M, 400, 401, 388; 99/487, 467, 474; 126/21 A; 426/243, 523; 34/1

[56] References Cited

U.S. PATENT DOCUMENTS

| | | | |
|---|---|---|---|
| 3,424,231 | 1/1969 | Truhan | 219/401 X |
| 3,674,422 | 7/1972 | Gray | 219/10.55 R |
| 3,825,723 | 7/1974 | Roeser | 219/400 X |
| 3,972,277 | 8/1976 | Tamano | 99/451 |
| 4,010,349 | 3/1977 | Lee | 219/400 X |
| 4,154,861 | 5/1979 | Smith | 219/10.55 E |
| 4,162,381 | 7/1979 | Buck | 219/10.55 B |
| 4,173,215 | 11/1979 | Bureau et al. | 219/401 X |
| 4,426,923 | 1/1984 | Ohata | 219/400 X |
| 4,454,404 | 6/1984 | Zushi | 219/10.55 B |
| 4,492,839 | 1/1985 | Smith | 219/10.55 R |

Primary Examiner—Philip H. Leung
Attorney, Agent, or Firm—Crutsinger & Booth

[57] ABSTRACT

A method for controlling the water vapor content of recirculating air in a conveyorized convection oven for food products wherein the temperature of recirculating air is maintained at or above the desired temperature which the food product is to attain before exiting the oven. Recirculating air contacts water in a reservoir maintained at a temperature below the temperature of the recirculating air, but above the temperature of food products entering the oven.

21 Claims, 10 Drawing Sheets

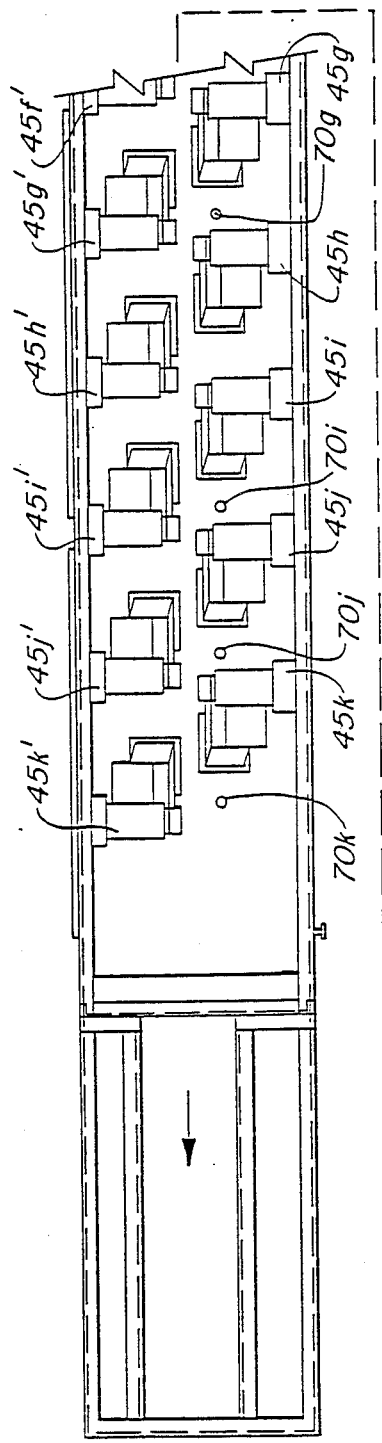
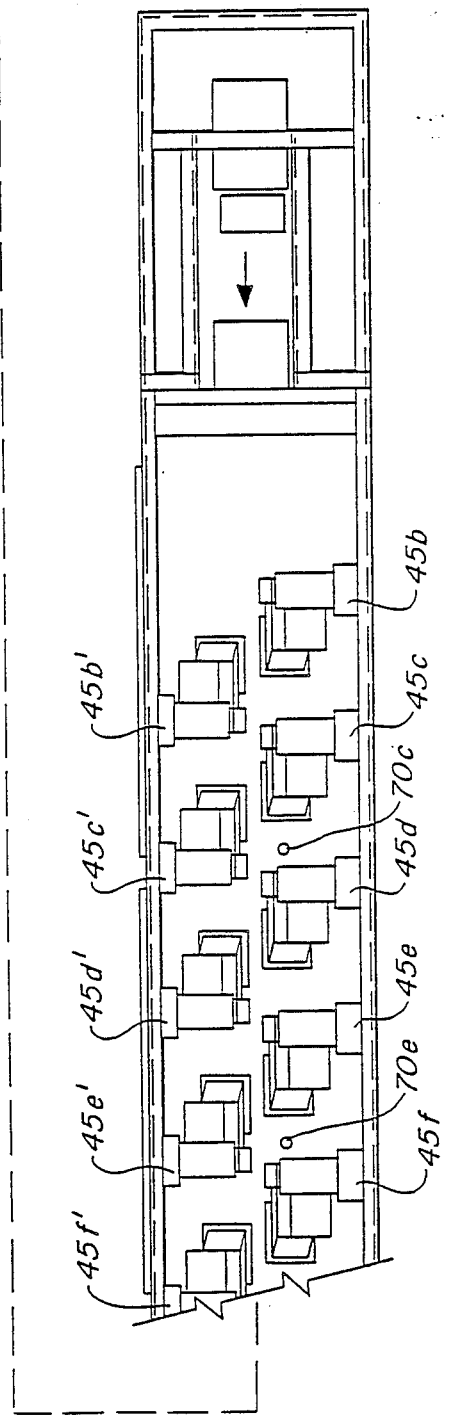
FIG. 8

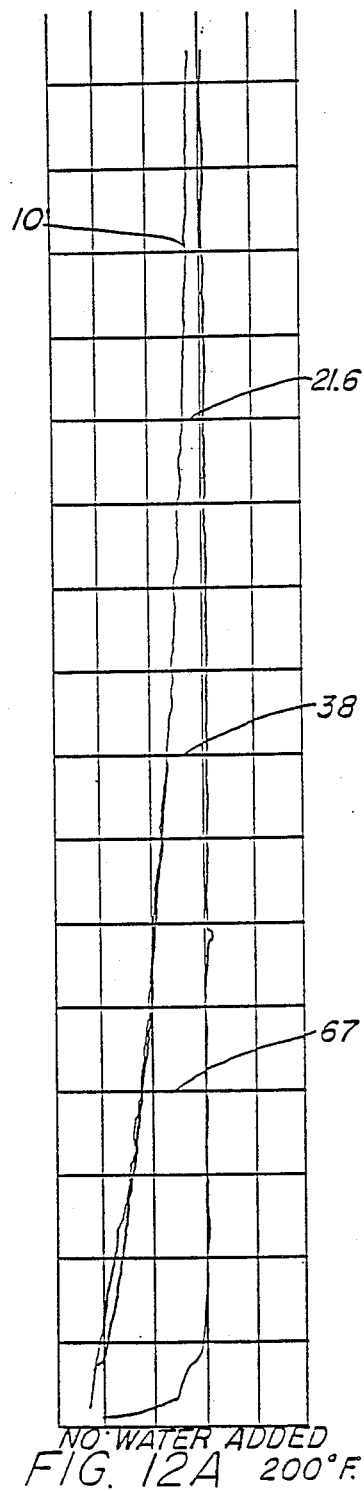
FIG. 12A  NO WATER ADDED  200°F.
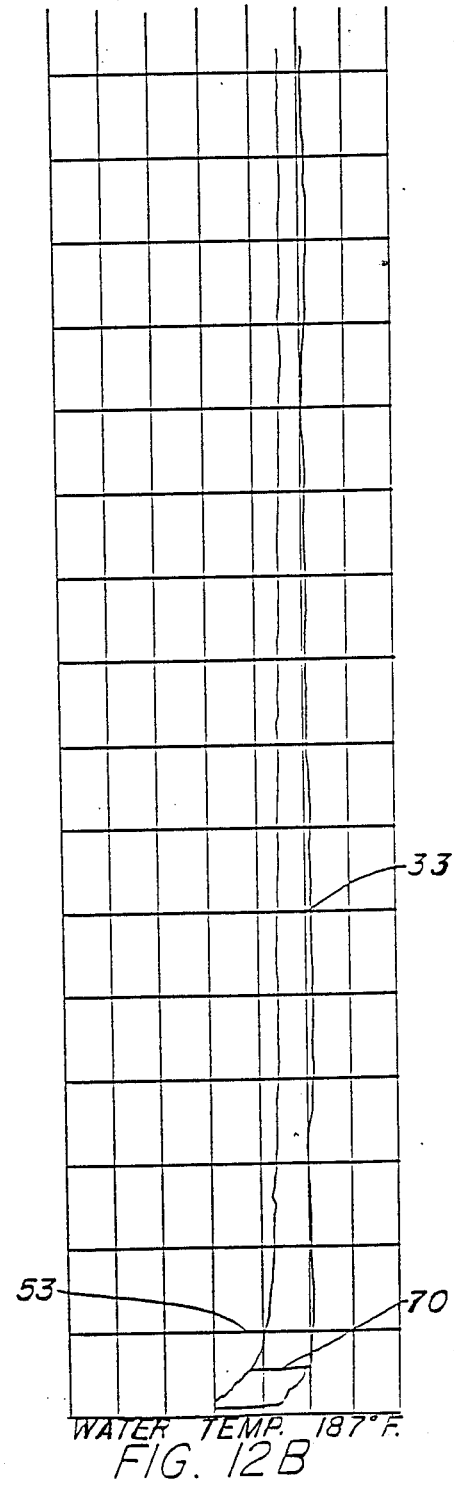
FIG. 12B  WATER TEMP. 187°F.

METHOD AND APPARATUS FOR WATER VAPOR CONTROL IN CONVECTION OVENS

This application is a continuation of now abandoned application Ser. No. 07/029,323, filed March 23, 1987, which is a continuation of now abandoned application Ser. No. 06/689,654, filed January 8, 1985 which is a continuation-in-part of application Ser. No. 06/407,943, filed August 13, 1982, now Pat. No. 4,492,839. The patent applications and patent application Ser. No. 06/523,645, filed August 15, 1983, now abandoned, are incorporated by reference herein in their entirety, and make a part hereof.

The need need for controlling the moisture content of food products during cooking is well known. This need is especially important when food products are baked relatively quickly at high temperatures. Under cooking or sogginess may result where the moisture content of the food products remains too high during cooking. Conversely, blistering, shrinking or over-browning may occur where too much moisture is removed from the surface of food products during baking.

Although methods and apparatus have previously been developed for controlling the moisture of food products in closed systems, such methods have typically relied upon the experience and skill of operators in controlling the temperature and humidity within desired limits determined largely by trial and error for particular food products.

Controlling the moisture content of food products during baking is even more difficult in the conveyorized convection ovens that are used commercially. With such ovens it is not only important to control the moisture content so as to achieve uniformity and high quality in the food products, but also to achieve those results with the least necessary expenditure of energy.

According to the present invention, a method and apparatus are provided for controlling moisture in conveyorized convection ovens through use of a water or humidity reservoir that can be internal or external to the oven itself.

According to a preferred embodiment of the invention, a water reservoir is provided within a conveyorized convection oven for use in controlling the water vapor content of recirculating air within the oven during baking.

According to another embodiment of the invention, a method for controlling the water vapor content of recirculating air in a conveyorized convection oven is provided that comprises the steps of controlling the temperature of recirculating air within the oven at or above the desired temperature for food products exiting the oven, and contacting the recirculating air with a water reservoir maintained at a temperature below the temperature of the recirculating air, but above the temperature of food products entering the oven.

According to another embodiment of the invention, a method and apparatus for controlling the water vapor content of recirculating air in a conveyorized oven are provided wherein the water vapor content of the recirculating air is maintained below its saturation point to promote condensation on the surface of food products entering the oven and to promote evaporation from the surface of food products exiting the oven.

According to another embodiment of the invention, a method and apparatus are provided for controlling the water content of recirculating air in a conveyorized convection oven by combining the recirculating air with relatively drier outside air to reduce the degree of saturation of the recirculated air.

According to another embodiment of the invention, a method and apparatus for maintaining the temperature of the water reservoir within a conveyorized convection oven below the temperature of the recirculating air within the oven are provided whereby the recirculating air is combined with relatively cooler outside air prior to contacting the water in the reservoir.

According to another embodiment of the invention, a method and apparatus are provided whereby the recirculating air sequentially contacts food products moving through a conveyorized convection oven in a direction countercurrent to the direction of travel of the food products through the oven.

According to another embodiment of the invention, a. method and apparatus for controlling the water vapor content of recirculating air in a convection oven employing impingement heating are provided.

According to another embodiment of the invention, a method and apparatus for controlling the water vapor content of recirculating air in a convection oven also employing microwave heating are provided.

These and other advantages and improvements of the method and apparatus disclosed herein are better understood and appreciated by reference to the aforementioned patent applications also incorporated by reference herein, and to the description below when considered in conjunction with the following figures of the drawings, wherein:

FIG. 8 is a top plan view of the oven, parts being broken away to more clearly illustrate details of construction;

FIGS. 11, 12(A) and 12(B) depict experimental data supporting the benefit derived through use of the present invention.

Control of the water vapor content of air within a convection oven, even at temperatures above the boiling point of water, is often very important for achieving desired heat transfer and product surface effects. The water vapor content of air in the oven relative to the water content of saturated air (relative humidity) is also very important to heat transfer and surface effects. There is a marked difference in results between controlled water vapor content and so-called atmospheric steaming or heating with super-heated steam.

Figure 1:
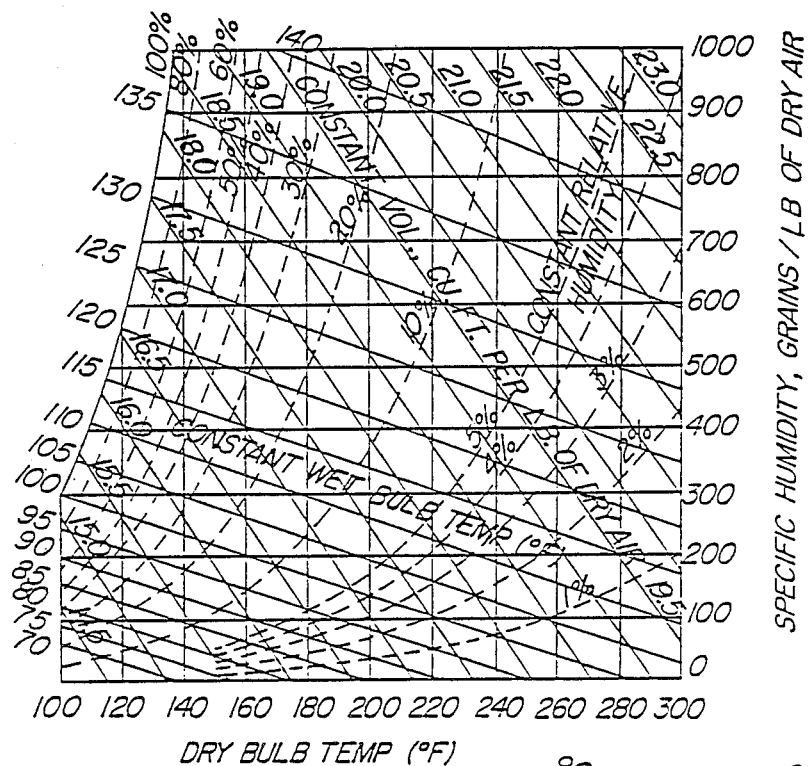
FIGS. 1 and 2 are diagrams illustrating the water content of air at various temperatures.
Figure 2:
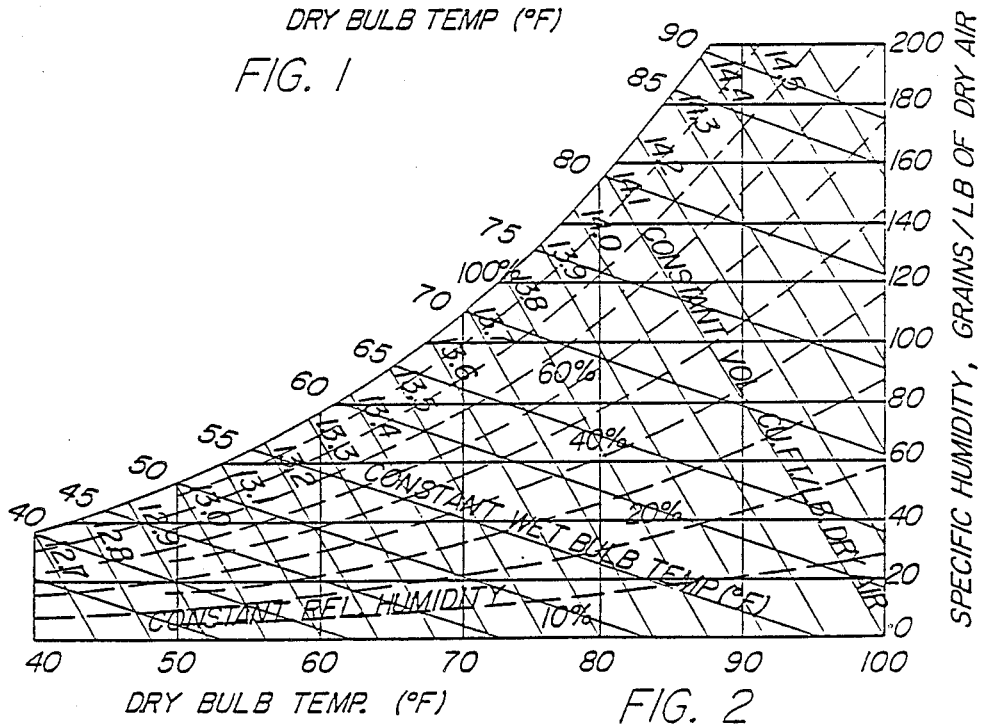

Some of the effects are illustrated by proofed bread dough at temperature of 100° F. entering an oven at 350° F. in which the water vapor content is equivalent to air saturated with water vapor at 170° F. When cold dough enters the oven, water vapor condenses on the surface, giving rapid uniform heat transfer and surface moistening. The degree of heat transfer and moistening is very responsive to the amount of water vapor in the air and in the temperature range between 100° F. and boiling water. This water content increases extremely as the temperature increases. FIGS. 1 and 2 illustrate the water content of saturated air.

For products such as French breads, the moisture condensation on the surface assists formation of the smoothly glazed crust. As the bread bakes, the surface is heated above the boiling point of water and the condensed water is evaporated. Upon further heating the dry crust is formed and then is finally heated sufficiently to become crisp and brown.

Another example is in the heating of broiled fish or heating for serving of pre-prepared meals. The rapid initial heating of condensing water vapor is advantageous but the surface of the product when heated properly needs to be moist, but neither wet nor dry, i.e., not heated above the boiling point of water. If air temperatures are above the boiling point of water, points of food or the thin sections over bubbles or other low heat capacity areas become dried. Extreme drying give poor texture, shrunken skins or other objectionable results.

Two devices disclosed herein illustrate these effects advantageously.

Figure 3:
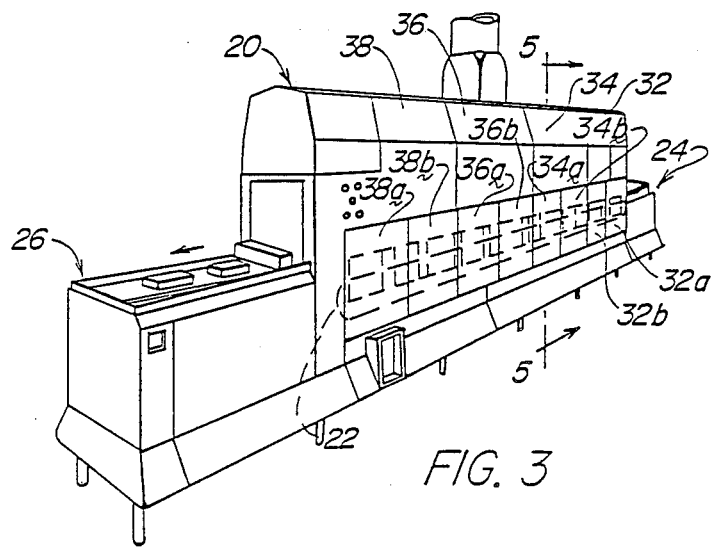
FIG. 3 is a diagrammatic perspective view of a conveyorized tunnel oven employing microwave and surface heating apparatus for heating a product as it is successively moved through a plurality of compartments.

Referring to FIG. 3 of the drawing, the numeral 20 generally designates a conveyorized tunnel oven having a conveyor 22 extending from an entrance end 24 to the exit end 26. As will be hereinafter more fully explained, the interior of the oven is provided with an elongated heating chamber 28 divided by partitions 29 to form a plurality of heating cavities 30a–30l, as best illustrated in FIGS. 4a and 4b.

Figure 6:
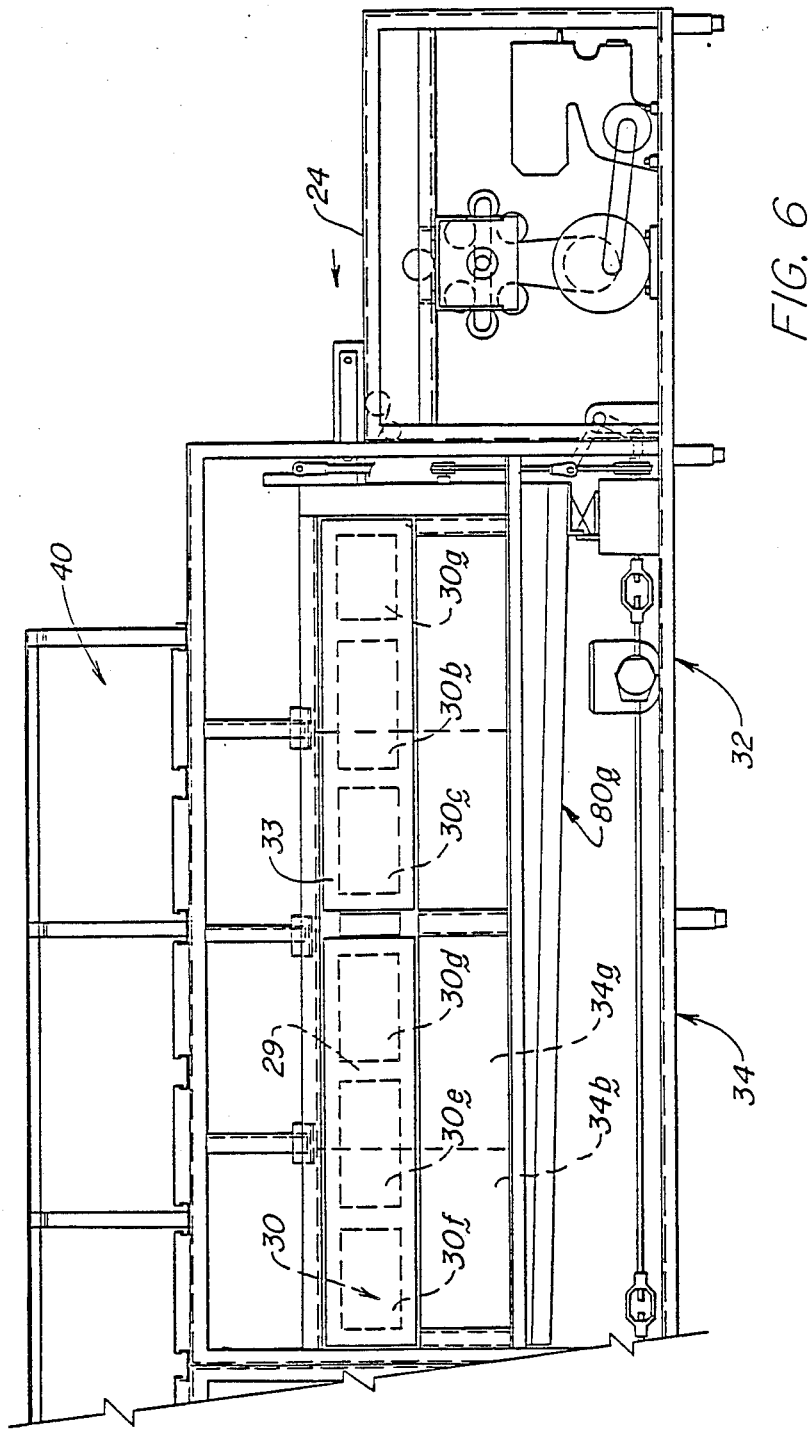
FIGS. 6 and 7 is an elevation view of the oven, parts being broken away to more clearly illustrate details of construction.
Figure 7:
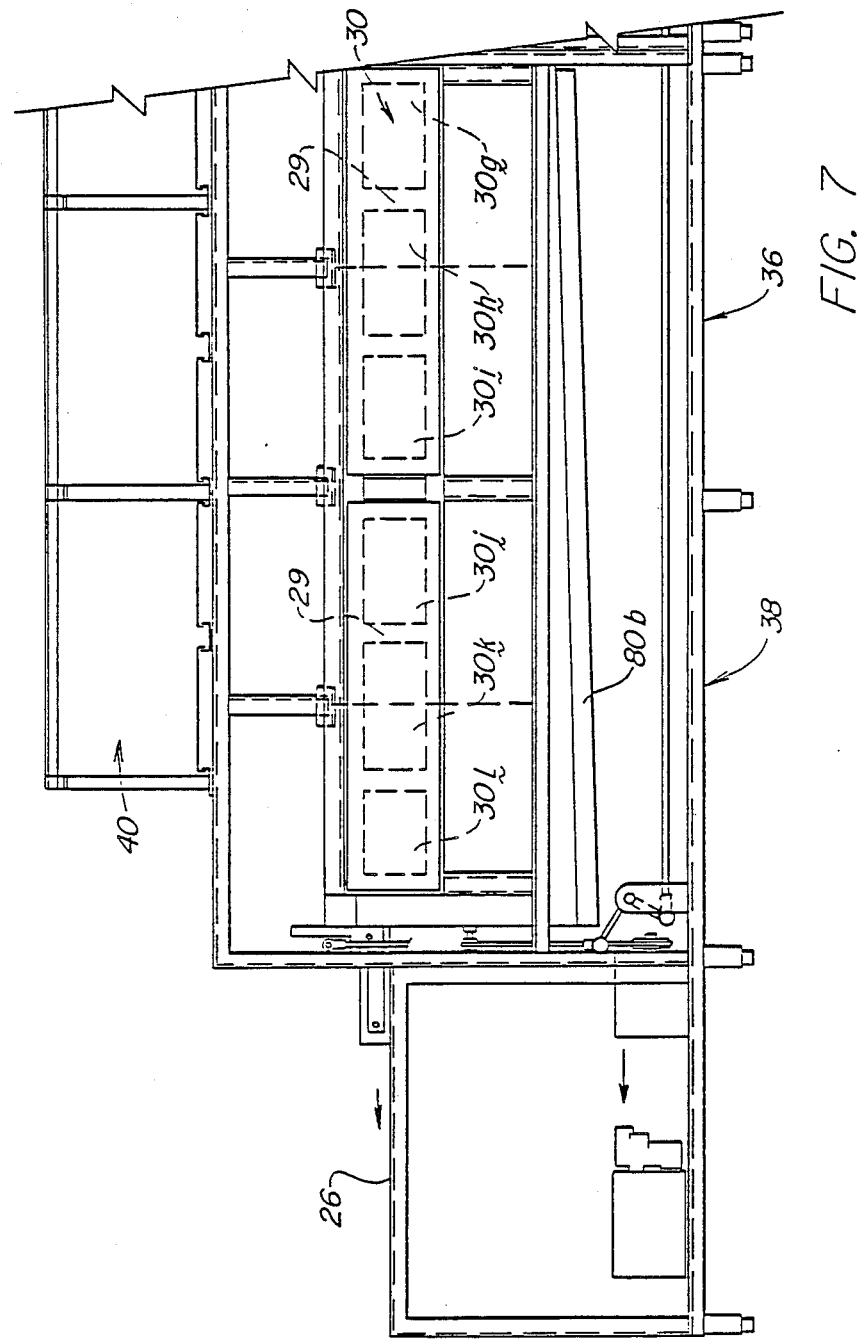
Figure 9:
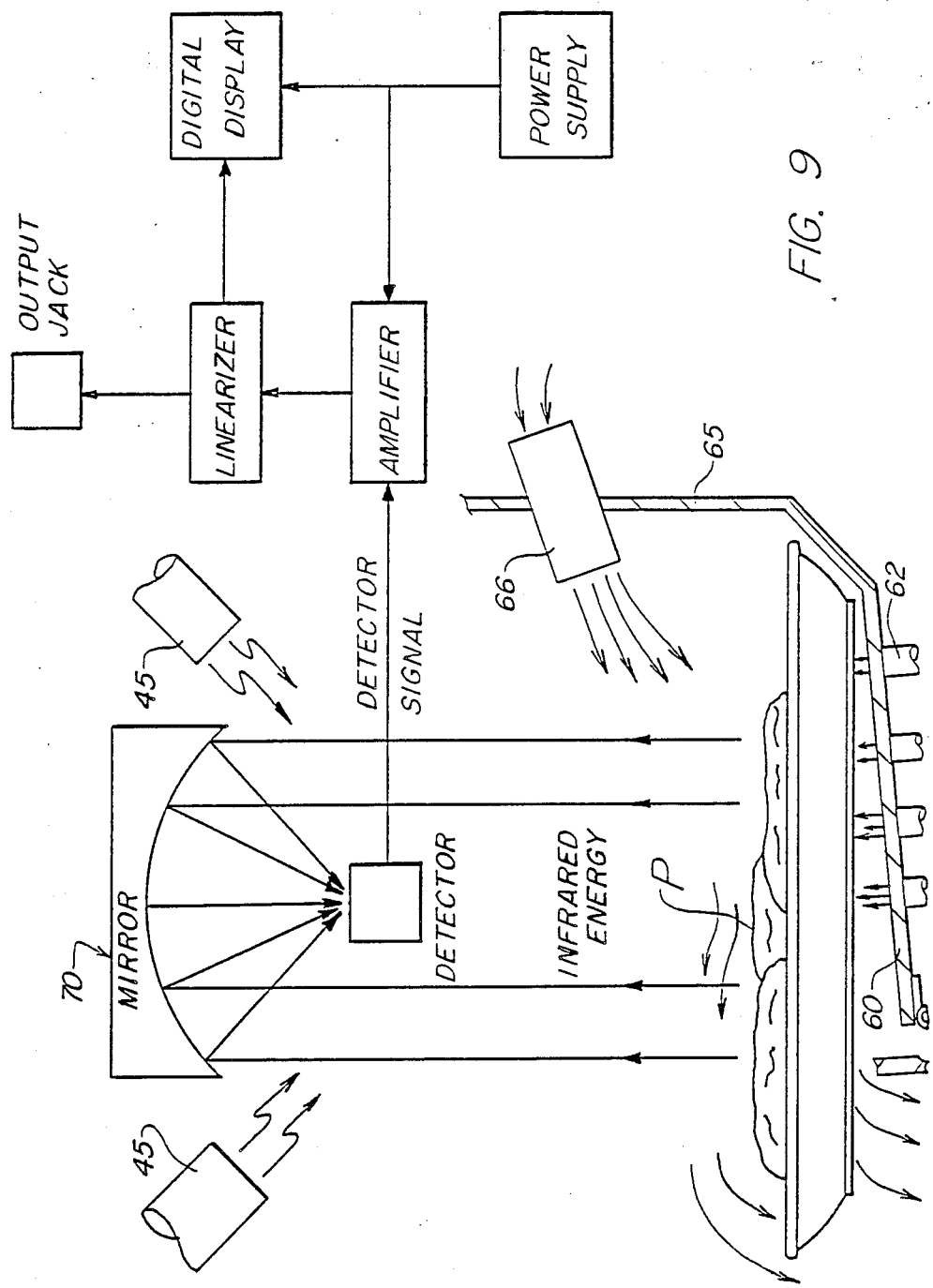
FIG. 9 is a diagrammatic view illustrating the control system.

In the particular embodiment of the invention illustrated in FIGS. 3, 6 and 7 of the drawing, the oven is of modular construction and comprises entrance section 32, two intermediate sections 34 and 36 and a delivery or exit section 38.

Entrance section 32 has a vertically swinging door 33 pivotally secured to a side wall of the oven for sealing cavities 30a, 30b and 30c. Vertically swinging doors 35, 37 and 39 are similarly mounted to close cavities 30d, 30d and 30f of intermediate section 34; cavities 30g, 30h and 30i of intermediate section 36; and cavities 30j, 30k and 30l of delivery section 38.

Horizontally swinging doors 32a and 32b are hingedly secured to opposite ends of the entrance section 32 and cover the vertically swinging door 33. Horizontally swinging doors 34a cover vertically swinging door 35; horizontally swinging doors 36a and 36b cover vertically swinging door 37 and horizontally swinging doors 38a and 38b cover vertically swinging door 39.

As best illustrated in FIGS. 5 through 8 a magnetron chamber 40 extends along the entire upper portion of the oven and is provided with forced circulation of filtered air to provide cooling for the electrical circuitry of magnetrons housed therein. The magnetrons for radiating microwave energy for heating the product are spaced as illustrated in FIG. 8 such that two magnetrons deliver microwave energy into each of the cavities 30b–30k. As will be hereinafter more fully explained, microwave energy is not delivered into entrance cavity 30a or into delivery cavity 30l.

A pair of magnetrons 45b and 45b' deliver microwave energy into cavity 30b while magnetrons 45c and 45c' deliver microwave energy into cavity 30c.

Figure 4:
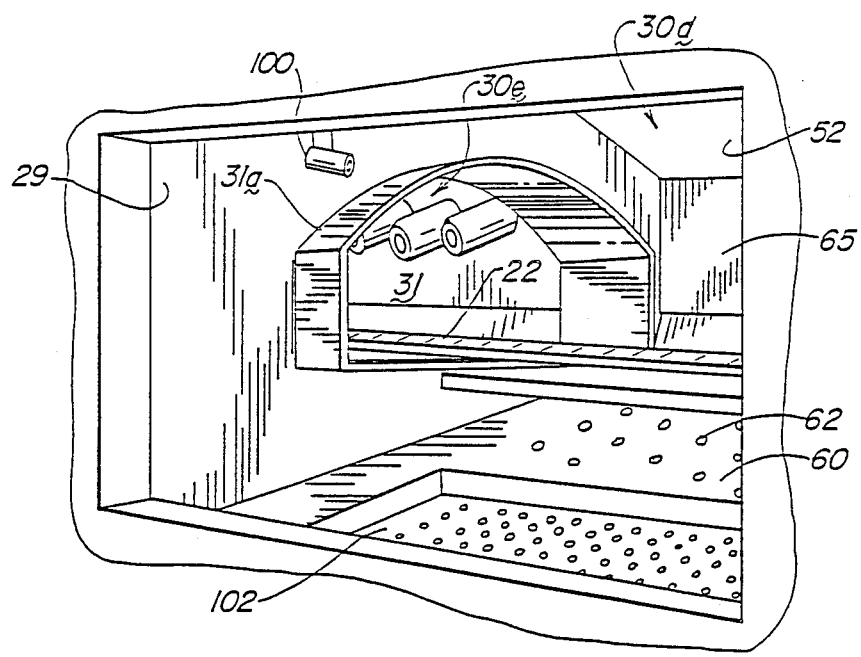
FIG. 4 is a fragmentary perspective view of the interior of a cooking chamber and a partition between adjacent chambers.
Figure 5:
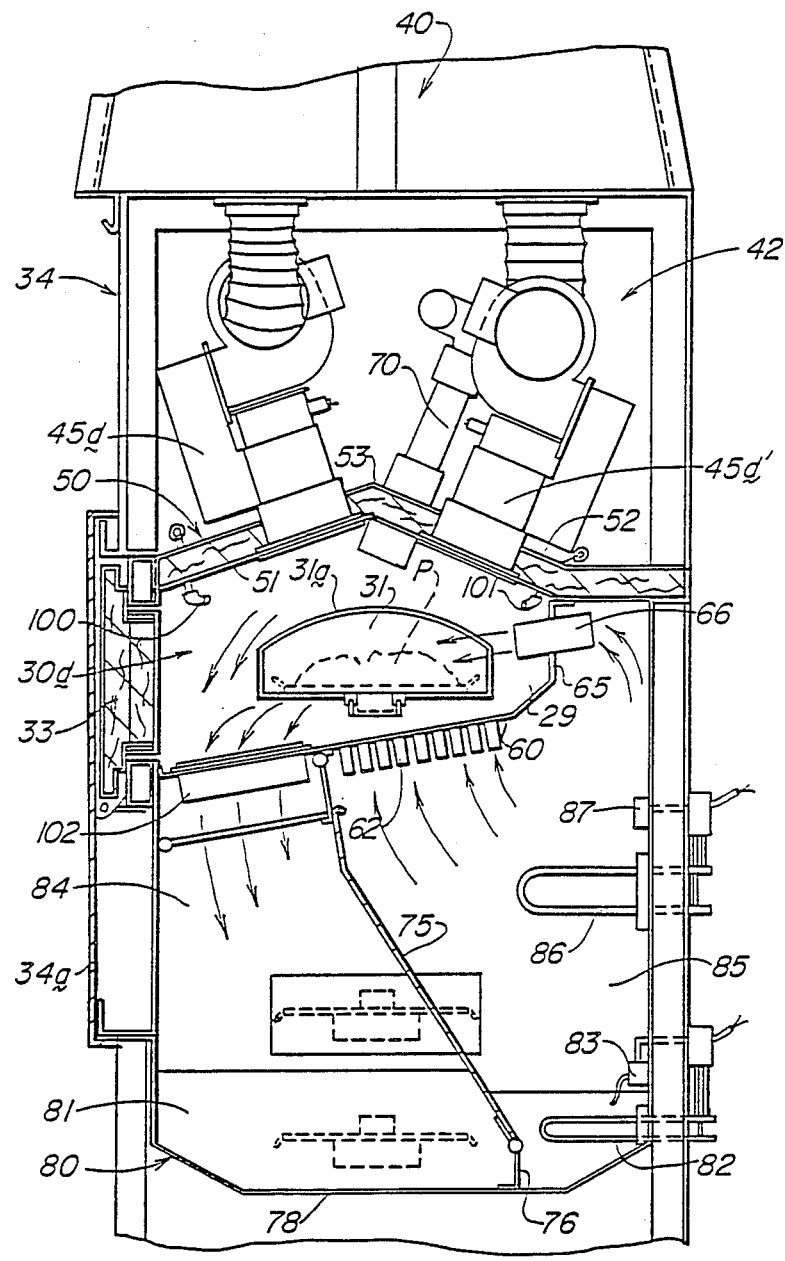
FIG. 5 is a cross-sectional view taken along line 3—3 of FIG. 3.

As best illustrated in FIGS. 4 and 5 each cavity is separated from the adjacent cavity by a partition wall 29 having a passage 31 formed therein through which containers carrying the product to be heated are carried by the conveyor 22. A choke 31a extends around the periphery of opening 31 to minimize the escape of microwave energy from one cavity to the adjacent cavity. The width of opening 31 is approximately equal to the width of the conveyor 22 and the upper portion of opening 31 is curved to permit movement of food products therethrough while minimizing the area of the opening.

The cavity 30d is formed between segments 51 and 52 of a hip roof or top wall 50 having a ridge 53 extending longitudinally of the oven and defining the upper boundary of the heating chamber 28. The floor 60 of the heating chamber is perforated and tubes 62 having a length of at least about two times the diameter of the tube are positioned in communication with perforations in the floor 60 to form columnated jets of air which impinge against the lower surface of the container carrying the product through the oven, as will be hereinafter more fully explained. The back wall 65 of the conveyor has a plurality of tubes 66 extending therethrough for directing a flow of air over the surface of the product P.

The roof 50 and bottom wall 60 are secured to the front wall of the oven having openings formed therein closed by vertically swinging doors 33, 35, 37 and 39.

As will be hereinafter more fully explained, an infrared sensor 70 which is adapted to collect infrared energy emitted by the product and provides a "readout" of the temperature of the product. Infrared sensors of this type are commercially available from Mikron Instrument Company, Inc. of Ridgewood, New Jersey or from Wahl Instruments, Inc. of Culver City, California. Such devices are described in detail in Wahl Catalog No. W101D, Revision A and in Mikron M65 Infrared Temperature Measurement and Control Systems Catalog 65 Rev. 0, each of the catalogs being incorporated herein by reference in its entirety.

As best illustrated in FIG. 8 infrared sensors 70c, 70e, 70g, 70i, 70j and 70k sense the temperature of the product in cavities 30c, 30e, 30g, 30i, 30j, and 30k, respectively. The first heating cavity 30a is not provided with either magnetrons or infrared sensing devices. Magnetrons 45b and 45b' radiate microwave energy to heat a product in cavity 30b. However, an infrared sensor is not provided in cavity 30b, in the particular embodiment of the invention illustrated, since most products delivered through the oven will require at least some microwave heating. Infrared sensor 70c is provided in the third cavity 30c for sensing the temperature of the product and turning off the magnetrons 40c and 40c' when the surface temperature of the product reaches a predetermined level. Infrared sensor 70c also controls magnetrons 45d and 45d' in heating cavity 30d. Thus, in the illustrated embodiment, if the surface temperature of the product is not sufficiently high by the time the product leaves chamber 30c, the product will be heated in chamber 30d and sensor 70e will terminate heating of the product in chamber 30e if the surface temperature of the product has reached the predetermined level. The exit cavity 30l is not provided with microwave heating or an infrared sensor. However, cavities 30i, 30j, and 30k are each provided with infrared sensors to provide precision control of the final temperature of the product as it is moved through the heating chamber 28 by conveyor 22.

According to a preferred embodiment of the invention, the operation of magnetrons 45 and infrared sensors 70 is controlled through use of a microcomputer that is programmed with one or more thermal treatment cycles for use with various food products or combinations of food products. If desired, conveyor 22 can also be computer controlled so as to coordinate its operation with that of magnetrons 45 and sensors 70, thereby improving the overall efficiency of oven 20.

The particular conveyorized tunnel oven hereinbefore described is intended for heating or cooking 300 meals per hour and to provide a maximum of two minutes of heating time for each meal. The heating chamber is divided into ten cavities which are provided with microwave energy radiating magnetrons and the conveyor 22 is driven on a timed cycle to maintain the product in each cavity for a period of twelve seconds.

As best illustrated in FIGS. 5 through 7 a partition 75 extends downwardly from the floor 60 of the heating chamber and the lower end is supported by spaced support members 76 above the bottom 78 of water troughs 80a and 80b to permit flow of water laterally across trays 80a and 80b below partition 75.

A heating element 82 is provided for heating water in tray 80 and a thermostat control 83 is provided for controlling the heating element 82 for maintaining water in tray 80 at a precisely controlled temperature. Partition 75 divides the space below floor 60 and above the surface of water 81 in tray 80 into an air return duct 84 and a plenum 85. A heating element 86 is positioned in plenum 85 and is adapted to heat air flowing thereacross, heating element 86 being controlled by a thermostat 87 to maintain the air temperature in the plenum at a predetermined level.

A pair of water spray nozzles 100 and 101 are positioned adjacent opposite corners of each of the cavities 30 for spraying water through the cavity for the purpose of cleaning. The bottom wall 60 is inclined downwardly toward air return duct 84 and the floor 60 has openings formed in the perforated bottom of a tray 102 to permit flow of water sprayed from spray nozzles 100 and 101 to return through the return duct 84 to trays 80a and 80b. Since the level of water in the tray is above the lower edge of partition 75 grease and other matter floating on the surface of the water will not flow downwardly into the plenum 85. By maintaining the temperature of the water in tray 80 and the temperature of the air in the plenum at controlled levels the wet bulb temperature of air in plenum 85 and flowing into the cavities of the heating chamber is precisely controlled.

From the foregoing it should be readily apparent that by maintaining the temperature and relative humidity of the ambient atmosphere in the cavities of heating chamber at a predetermined web bulb temperature to assure that the ambient atmosphere is substantially saturated, evaporation of moisture from the surface of the food product during the heating cycle will be minimized. It has been observed that evaporation of moisture from the surface of the product results in cooling of the surface of the product and results in an erroneous readout of the temperature of the surface of the product by infrared sensors 70. However, by preventing evaporation from the surface of the food product, the surface temperature of the product can be accurately determined by infrared sensors 70 and the temperature accurately controlled.

When a cold product moves into cavity 30a the tray and the product are immediately contacted by the warm moist air which results in condensation of liquid onto the surface of the product. Heat is immediately transferred to the surface of the product as a result of the latent heat of condensation and the moisture condensed onto the surface of the product prevents drying of the product as it is moved through the heating chamber.

The product will receive microwave energy in chamber 30b and the tray will be heated from the bottom by columnated jets of air flowing through tubes 62 which impinge against the lower surface of the tray. Air currents flowing through tubes 66 sweep across the upper surface of the product and the air flow is directed across the lens on the sight tube of infrared sensor 70 to prevent the formation of condensate on the lens surface which would result in an erroneous temperature reading.

As the product moves through the heating chamber from one cavity to another the delivery of microwave energy to the product will be terminated when the surface of the product reaches a predetermined temperature. As the product moves from one cavity to the other, each infrared sensor will sense the temperature of the product. If the product has not been uniformly heated throughout, heat will be conducted from the surface of the product to the center portion of the product which will result in cooling of the surface of the product and result in magnetrons in the subsequent cavities being energized when the cooling of the surface of the product is indicated by infrared sensors 70.

While the heating chamber 28 hereinbefore described has been divided into ten separate cavities for sequential heating of various products as required in each individual cavity, it should be appreciated that the entire process may be accomplished in a single cavity.

The Enersyst PFF-2 Food Finisher shown in FIGS. 3 through 9 has a large water reservoir under the conveyor which carries pre-prepared meals through a heating tunnel. The air which is directed onto the means as they proceed through the tunnel is recirculated over the water reservoir. In use, the recirculated air temperature (dry bulb) is at 180° F. to aid heating of the meals and the plates. The temperature of the water in the reservoir is held at 145° F/. In the closed system, the recirculating air would heat the water to nearly 180° F. which would result in wet foods and wet plates. The temperature of the water in the reservoir is controlled by an electric heating element to initially warm it and then by thermostatically controlled addition of cold water to control the upper temperature limit. An alternative control is to introduce cool ambient air just prior to the area where the air passes over the water reservoir to control the water vapor content in the air by a combination of air cooling and evaporation cooling. This procedure expends energy by the equivalent air and water vapor wich must be exhausted.

Figure 10:
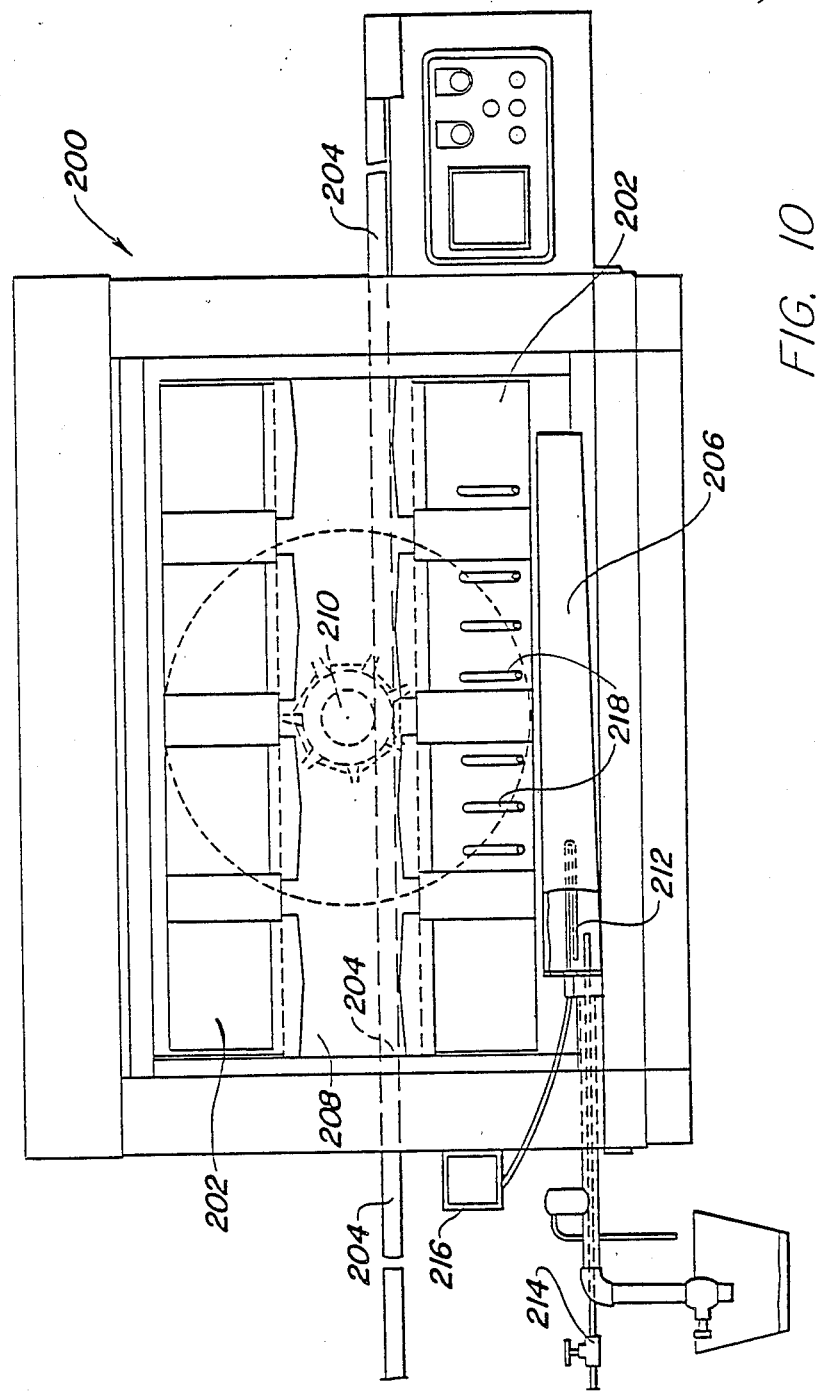
FIG. 10 is a front elevation view, partially in section, of a conveyorized, forced convection oven employing impingement heating together with the water or humidity control reservoir of the invention.

Another embodiment of this invention is in an electrically heated jet impingement oven as shown in FIG. 10. In this oven, a temperature controlled water reservoir has jets of air which impinge on its surface to give very effective heat transfer and water vaporization.

It is important to record that this condensation heat transfer and the subsequent controlled surface conditioning is greatly enhanced by the application with jet impingement air-to-solid interface. In addition to the well known accelerated heat transfer, the condensation heat transfer is markedly enhanced by the fact that the air which remains after the water vapor condenses is rapidly swept away by the air jets so that fresh moisture-laden air contacts the surface. Additionally, when the product nears the end of the heating cycle the jets air drying by sweeping away the water vapor concentrated near the product surface. The accelerated air-to solid heat transfer of the impinging jet also permits use of lower air temperatures to achieve desired final surface effects such as partial drying or browning and these lower temperatures make much more tolerant operation to avoid localized over-drying or over-heating.

FIG. 10 depicts a front elevation view, partially in section, of conveyorized, forced convection oven 200 employing jet fingers 202 for impingement heating of food products disposed on conveyor 204. FIG. 10 further depicts water reservoir 206 disposed beneath plenum 208 for recirculating heated air to jet fingers 202 within oven 200. A fan 210 is depicted in phantom for use in recirculating air through oven 200. Electric heaters 212 and an external water supply 214 are also shown in FIG. 10 for use in conjuction with a control means 216 for controlling the temperature of water within water reservoir 206. Directors 218 are provided to increase air flow across reservoir 206.

In the oven of FIG. 10, jets of air are directed at the surface of the water to give accelerated water vapor addition or subtraction as required to maintain the desired water vapor content of the recirculating air.

In a single recirculating air circuit, as in a single heating zone continuously fed conveyorized oven, the moisture-laden air from near the exit end of the oven can be recirculated to impinge on the cool incoming product to extract some of the energy of condensation before that air is passed over the water reservoir.

This "regeneration" cycle using the concentrated water vapor from the drying product to provide sensible heating and moisture addition to the incoming product can be a major factor of energy savings and product yield in moist products which are being cooled in such a continuous feed recirculating air heating system.

This regenerating water vapor recirculation can, theoretically, eliminate the need for the temperature controlled water reservoir. However, results or means of starting and stopping the continuous system without excess moistening or drying must be considered.

Direct fired gas heat ovens are not necessarily eliminated as disadvantageous in this controlled water vapor content and regenerative system. It is important that the flue losses be kept at reasonable minimum, but if the flue heat is used to preheat the combustion air, then the combustion air becomes the ambient air coolant which keeps the air in the oven from becoming too saturated.

In many food heating operations such as pastry or bread baking or cooling some meats, approximately as much energy is spent in evaporating water as in actually heating the product. The efficiency of the regenerative recirculation which is greatly enhanced by the jet impingement air-to-solid heat transfer can save much of this energy and, in some case, save food quality and marketable yield too.

Figure 11:
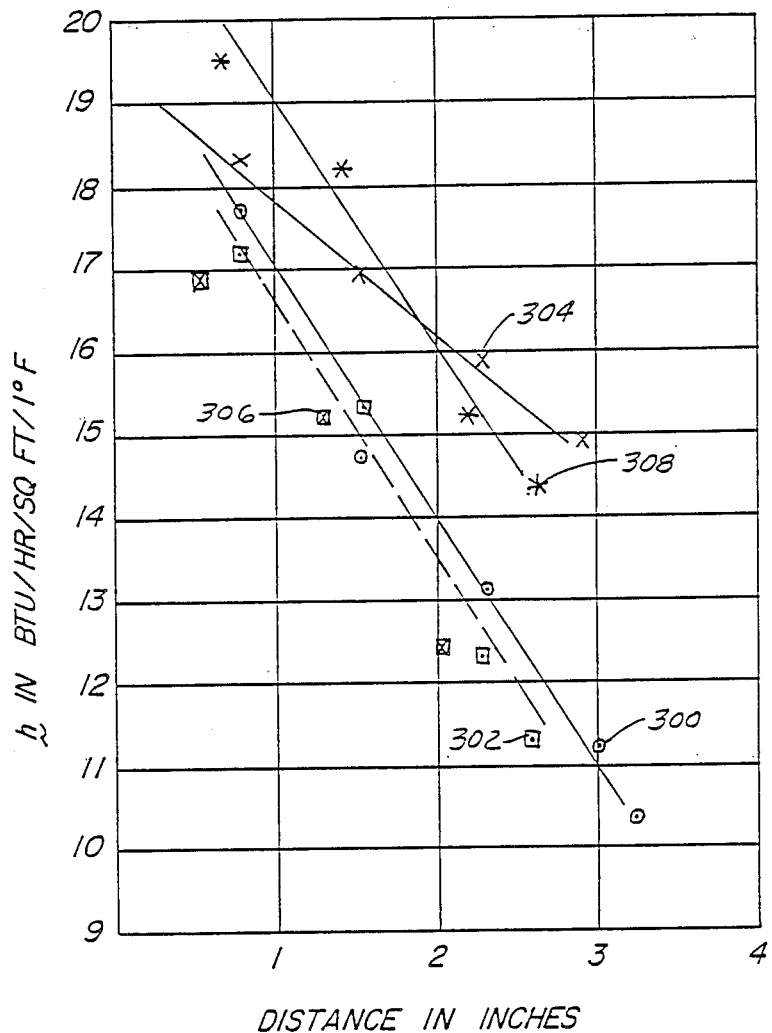

In FIGS. 11, 12(A) and 12(B), the rate of heat transfer of the condensing water vapor, the following water evaporation and then the heating of the product above the temperature of the condensing water are shown in the comparative heating curves of temperature change in an aluminum plate heated by jets of air which in FIG. 12(A) has no added water vapor and which in FIG. 12(B) has water vapor added to nearly equilibrium with 187° F. water and 200° F. air temperature.

The rate of heat exchange in the first half minute of FIG. 12(B) is 108 BTU/Sq.Ft./Hr./° F. When the water starts to evaporate after the surface of the product (aluminum plate) reaches the water reservoir (wet bulb) temperature, the rate of heat input drops to the range of 5 BTU/Sq.Ft./Hr./° F.

For comparison, the rate of heat transfer in the dry air as shown in FIG. 12(A) is a nearly steady 15 BTU/Sq.Ft./Hr./° F.

Other modifications and improvements will become apparent to one of ordinary skill in the art upon reading this disclosure, and it is intended to cover all such modifications as fall within the scope of the amended claims.

What is claimed is:

1. A method for controlling the water vapor content of recirculating air in a conveyorized convection oven for food products, said method comprising the steps of: controlling the temperature of said recirculating air at or above the desired temperature for food products exiting said oven; forming first jets of said recirculating air; directing said first jets at the surface of liquid in a reservoir maintained at a temperature below the temperature of said recirculating air, but above the temperature of food products entering said oven, to maintain the water vapor content below the saturation point of the recirculating air; forming second jets of recirculating air; and directing said second jets toward the surface of a food product moved by a conveyor, such that moisture carried by said second jets condenses onto the surface of a food product to provide rapid initial heating and such that the second jets controllably evaporate moisture from the surface of the food product and remove a moist boundary layer of air after the temperature of the food product increases to accelerate the rate of heat transfer between the recirculating air and the food product while preventing excessive drying of the food product.

2. The method of claim 1 wherein the recirculated air is further combined with relatively drier outside air to reduce the saturation of said recirculated air.

3. The method of claim 1 wherein the water vapor content of said recirculating air is maintained below its saturation point to promote condensation on the surface of food products entering said oven and evaporation from the surface of food products existing said oven.

4. The method of claim 3 wherein recirculating air sequentially contacts food products moving through said oven in a direction countercurrent to the direction of travel of said food products such that moisture evaporated from the surface of heated food products is condensed onto the surface of cooler food products.

5. The method of claim 1 wherein the recirculating air is further combined with relatively cooler outside air prior to contacting said water reservoir to maintain the temperature of said water reservoir below the temperature of said recirculating air.

6. The method of claim 1 wherein the temperature of said water reservoir is maintained below the temperature of said recirculating air by the controlled addition of relatively colder water to said water reservoir.

7. The method of claim 1, further comprising the step of heating said food products by microwave energy.

8. The method of claim 1, further comprising the steps of: forming jets of said recirculating air after the air has been diffused at the liquid surface to form jets of moisture laden air; and directing said jets of moisture laden air across the surface of a food product to condense moisture onto the surface of the food product and to sweep away diffused air from which moisture has been condensed.

9. The method of claim 8 with the addition of the steps of: circulating the air through a first compartment to condense moisture from the air on the surface of a food products having a temperature less than the dew point of the air; and circulating the air across the surface of a food product having a temperature above the dew point of the air in a second compartment to evaporate moisture from the surface of the food product.

10. The method of claim 9, wherein the food product is proofed dough having an initial temperature near 100° F.; the liquid temperature is maintained at approximately 170° F. and the air temperature is about 350° F.

11. A conveyorized convection oven for increasing the temperature of food products passing through said oven from an inlet temperature to a desired higher outlet temperature, said oven comprising:
 (a) means for circulating air within said oven;
 (b) means for controlling the temperature of said air at or above the desired outlet temperature of said food products;
 (c) a water reservoir;
 (d) means for controlling the temperature of water within said reservoir between the inlet temperature of said food products and the temperature of said air;
 (e) means for sequentially contacting said temperature controlled air with said water and with said food products; and
 (f) means for continuously controlling the temperature of water within said reservoir at a level above the temperature of said food products and below the temperature of said air to maintain the dewpoint of the air substantially equal to the desired outlet temperature of the product.

12. The oven of claim 11 wherein said means for circulating air within said oven further comprises means for contacting said air with said food products in a direction countercurrent to the direction of travel of said food products.

13. The oven of claim 11, further comprising impingement means for contacting said temperature-controlled air with said food products.

14. The oven of claim 11, further comprising impingement means for contacting said temperature-controlled air with said water.

15. The oven of claim 11, further comprising means for combining said circulating air with relatively cooler outside air.

16. The oven of claim 11 wherein said means for controlling the temperature of water within said reservoir further comprises means for controllably introducing relatively cooler water into said reservoir.

17. The oven of claim 11 wherein said means for controlling the temperature of water within said reservoir further comprises electric heating means.

18. The oven of claim 11 further comprising microwave heating means.

19. The oven of claim 11, said oven further comprising: a multi-cavity cooking chamber; conveyor means to move food products through cavities in said cooking chamber; means directing jets of said air toward the surface of water in said reservoir to accelerate the transfer of moisture between the air and the water; and means directing jets of said air to impinge against the surface of the food product in said cavities such that moisture condenses on the surface of the food product in a first of said cavities and evaporates from the surface in a second of said cavities.

20. An oven for cooking a dough food product comprising: a cooking chamber; means maintaining air in said cooking chamber at approximately 350° F. with a moisture content approximately equivalent to that of air saturated with moisture at approximately 170° F.; means for moving proofed dough into said chamber such that moisture condenses on the surface of the dough to provide initial heating; and means directing jets of air over the surface of the dough to evaporate condensed moisture and to form a crisp brown crust on the dough.

21. A conveyorized convection oven for increasing the temperature of dough food products passing through said oven from an inlet temperature to a desired higher outlet temperature, said oven comprising: a cooking chamber; means for circulating air in said cooking chamber; means for maintaining the temperature of air in the cooking chamber at approximately 350° F.; a water reservoir; means circulating air relative to water in said reservoir to maintain the dewpoint of the air substantially equal to that of air saturated with moisture at approximately 170° F. such that moisture condenses onto the surface of dough in the chamber until the temperature of the dough reaches approximately 170° F. to provide initial heating; and means directing jets of air over the surface of the dough to evaporate condensed moisture after the temperature reaches 170° F. and to form a crust on the dough.

* * * * *